United States Patent
Xu et al.

(10) Patent No.: US 9,857,924 B2
(45) Date of Patent: Jan. 2, 2018

(54) TOUCH DEVICE AND MANUFACTURING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shaoying Xu, Beijing (CN); Xuecheng Hou, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 71 days.

(21) Appl. No.: 14/429,218

(22) PCT Filed: Jul. 31, 2014

(86) PCT No.: PCT/CN2014/083410
§ 371 (c)(1),
(2) Date: Mar. 18, 2015

(87) PCT Pub. No.: WO2015/113389
PCT Pub. Date: Aug. 6, 2015

(65) Prior Publication Data
US 2016/0026287 A1    Jan. 28, 2016

(30) Foreign Application Priority Data
Jan. 28, 2014    (CN) .......................... 2014 1 0042187

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01); *G06F 2203/04111* (2013.01)

(58) Field of Classification Search
CPC ................... G06F 3/044; G06F 3/0412; G06F 2203/04103; H04N 13/04; H01B 13/00;
(Continued)

(56) References Cited

U.S. PATENT DOCUMENTS

| 8,179,587 B2 | 5/2012 | Weber et al. |
| 2004/0189588 A1* | 9/2004 | Dong ................... G02B 6/0043 345/102 |

(Continued)

FOREIGN PATENT DOCUMENTS

| CN | 1132384 A | 10/1996 |
| CN | 1989445 A | 6/2007 |

(Continued)

OTHER PUBLICATIONS

Mar. 22, 2016—(CN)—First Office Action Appn 201410042187.1 with English Tran.

(Continued)

*Primary Examiner* — Vinh Lam
(74) *Attorney, Agent, or Firm* — Banner & Witcoff, Ltd.

(57) ABSTRACT

A touch device and a manufacturing method thereof. The touch device comprises: a pixel unit, the pixel unit being provided therein with an electrochromic layer, a pixel electrode and a thin film transistor acting as a switch for the pixel electrode, the pixel electrode being connected with the electrochromic layer; and a touch unit comprising a touch driving electrode and a touch sensing electrode disposed crossing each other and insulated from each other, for acquiring a touch position; the thin film transistor is configured to control the pixel electrode to operate according to (Continued)

the acquired touch position to apply a driving signal to the electrochromic layer connected with the pixel electrode.

20 Claims, 5 Drawing Sheets

(58) Field of Classification Search
CPC ..... H01L 29/78; H01L 21/336; G02F 1/3534; G02F 1/13; G02F 1/15; G02F 1/0107; G02F 2001/1504; G02F 2001/151; G02F 2001/1512; G02F 2001/1515; G02F 2001/1552; G02F 1/163; G02F 2201/44; G02F 1/157; C09K 9/02; B32B 17/10513; B60R 1/088; G09G 3/19; G09G 3/3433; G09G 3/38; F21S 48/1731; B41J 3/4076; F21V 14/003; G03H 2240/22; E06B 2009/2464
USPC .............. 345/48–50, 84–107; 359/265–273
See application file for complete search history.

(56) References Cited

U.S. PATENT DOCUMENTS

| | | | |
|---|---|---|---|
| 2006/0063351 A1* | 3/2006 | Jain | G02F 1/1362 438/455 |
| 2010/0243295 A1* | 9/2010 | Allemand | B82Y 10/00 174/250 |
| 2012/0075237 A1* | 3/2012 | Ikeda | G06F 3/044 345/174 |
| 2012/0134003 A1 | 5/2012 | Yeh et al. | |
| 2012/0194441 A1* | 8/2012 | Frey | G06F 3/041 345/173 |
| 2012/0218199 A1* | 8/2012 | Kim | G06F 3/0412 345/173 |
| 2013/0044094 A1 | 2/2013 | Li et al. | |
| 2014/0072778 A1* | 3/2014 | Feng | H01B 1/24 428/195.1 |
| 2014/0307303 A1* | 10/2014 | Lin | G02F 1/155 359/266 |
| 2015/0077361 A1* | 3/2015 | Seo | B60R 1/088 345/173 |
| 2015/0160760 A1* | 6/2015 | Sato | G06F 3/044 345/174 |
| 2015/0221283 A1* | 8/2015 | Jia | G09G 3/3266 345/207 |
| 2015/0277616 A1* | 10/2015 | Wang | G06F 3/044 345/174 |
| 2015/0331295 A1* | 11/2015 | Takahashi | G02F 1/1523 359/273 |
| 2016/0109994 A1* | 4/2016 | Liu | G06F 3/0412 345/174 |

FOREIGN PATENT DOCUMENTS

| | | |
|---|---|---|
| CN | 101673013 A | 3/2010 |
| CN | 101960374 A | 1/2011 |
| CN | 202502486 U | 10/2012 |
| CN | 102914929 A | 2/2013 |
| CN | 103092411 A | 5/2013 |
| CN | 103226274 A | 7/2013 |
| CN | 103293814 A | 9/2013 |
| CN | 103809809 A | 5/2014 |
| CN | 203689484 U | 7/2014 |
| JP | 2012221142 A | 11/2012 |

OTHER PUBLICATIONS

Electrochromism, <https://en.wikipedia.org/wiki/Electrochromism>, printed May 27, 2016, 1 page.
Oct. 8, 2014—International Search Report with Eng Tran of Written Opinion.

\* cited by examiner

TOUCH DEVICE AND MANUFACTURING METHOD THEREOF

The application is a U.S. National Phase Entry of International Application No. PCT/CN2014/083410 filed on Jul. 31, 2014, designating the United States of America and claiming priority to Chinese Patent Application No. 201410042187.1 filed on Jan. 28, 2014. The present application claims priority to and the benefit of the above-identified applications and the above-identified applications are incorporated by reference herein in their entirety.

TECHNICAL FIELD

Embodiments of the present invention relates to a touch device and a manufacturing method thereof.

BACKGROUND

In recent years, studies of application of electrochromic glass on intelligent windows have been carried out actively. This device, consisting of a host glass and a electrochromic system, has an adjustable light transmittance since transmittance of an electrochromic material can be changed under the effect of electric field and adjustable light illumination can be obtained as desired. With the characteristic of the electrochromic material that transmittance is adjustable under the effect of electric field, it is possible to selectively absorb or reflect external thermal radiation and prevent internal heat from dissipating, thereby saving power consumption of energy.

The main stream of current touch screens are based on liquid crystal or light emitting diodes. However, these touch screens have great power consumption, complex structures and high manufacturing costs.

SUMMARY

Embodiments of the present disclosure provide a touch device and a manufacturing method thereof.

A touch device comprises:

pixel units, the pixel unit comprising an electrochromic layer, a pixel electrode and a thin film transistor acting as a switch for the pixel electrode, the pixel electrode being connected with the electrochromic layer; and a touch unit comprising touch driving electrodes and touch sensing electrodes disposed in cross and insulated from each other, for acquiring a touch position;

the thin film transistors configured to control pixel electrodes to operate, according to the acquired touch position, to apply a driving signal to the electrochromic layer connected with the pixel electrode.

At least one embodiment of the present disclosure further provides a method for manufacturing a touch device, comprising:

preparing a substrate;

depositing a layer of first conductive film on the substrate, forming first electrodes and second electrodes disposed in cross and insulated from each other through a first patterning process, and breaking the first electrodes into a plurality of sub-electrodes in cross regions of the first electrodes and the second electrodes;

forming a first passivation layer over the first conductive film through a second patterning process;

depositing a second conductive film over the first passivation layer and forming bridging lines for connecting sub-electrodes and a common electrode through a third patterning process;

disposing an electrochromic layer on the common electrode, and forming a shielding layer on the bridging lines;

forming pixel electrodes connected with the electrochromic layer through a fourth patterning process;

forming thin film transistors acting as switches for the pixel electrodes.

Beneficial effects of the present disclosure are as follows. The touch device of the present disclosure acquires touch positions by the touch unit and controls the pixel electrodes to operate according to the touch position to apply driving signals to the electrochromic layer connected with pixel electrodes, making the electrochromic layer in pixel units corresponding to the pixel electrode to change color, thereby enhancing color change of the touch screen. And further, as the touch position is acquired by the touch unit, it is possible to control the electrochromic layer corresponding to the touch position to change color.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
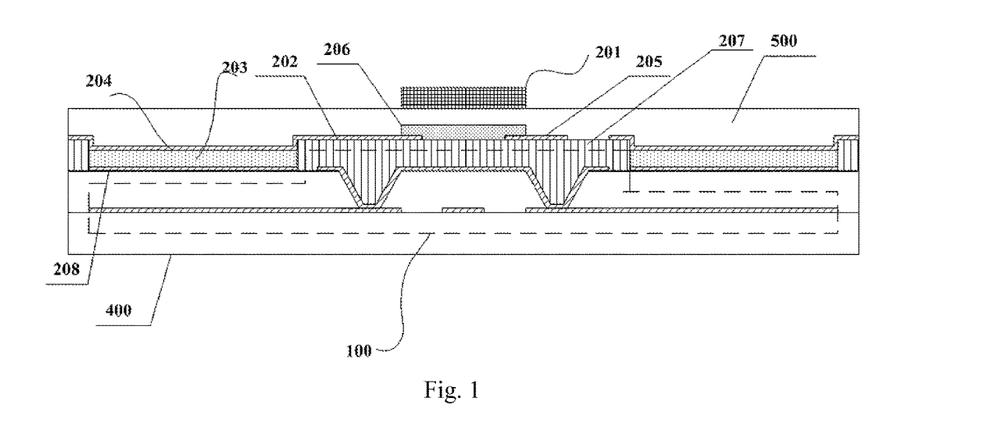
FIG. 1 is a schematic structural view of a touch device according to the first embodiment of the present disclosure.

FIG. 1 illustrates a structural principle diagram of a touch device according to a first embodiment of the present disclosure. The touch device comprises gate lines and data lines disposed crossing each other (not illustrated in the figure). Electrochromic layers 203, pixel electrodes 204 and thin film transistors acting as switches for the pixel electrodes are disposed in the pixel units defined by gate lines and data lines. The pixel electrode 204 is connected with the electrochromic layer 203, the thin film transistor has a gate 201 connected with a gate line, a source 205 electrically connected with a data line and a drain 202 electrically connected with a pixel electrode 204;

a touch unit 100 comprises a touch driving electrode and a touch sensing electrode disposed crossing each other and being insulated from each other, the touch unit configured to acquire a touch position.

the thin film transistor is configured to apply a driving signal to the electrochromic layer connected with the pixel electrode corresponding to the touch position according to the acquired touch position to enable the respective electrochromic layer to change color.

The touch device of the embodiment acquires the touch position by means of the touch unit, so as to apply the driving signal to the electrochromic layer connected with the pixel electrode corresponding to the touch position, making the corresponding electrochromic layer to change color, thereby increasing the color change of the touch screen. And it is possible to control the electrochromic layer corresponding to the touch position to change colors by acquiring the touch position by means of the touch unit. The touch device according to the embodiment can make pixel units to transmit or not transmit light under the effect of external light source, thereby achieving display.

In this embodiment, the electrochromic layer 203 disposed in a pixel unit is made of an inorganic or an organic electrochromic material. The inorganic electrochromic material can be a transition metal oxide or its derivatives, such as $WO_3$ (tungsten trioxide). The organic electrochromic material mainly comprises polythiophenes and their derivatives, viologens, tetrathiafulvalene, and metal phthalocyanine compounds.

Referring to FIG. 1 again, the touch device further comprises a base substrate 400 which can be one of a glass substrate, a metal substrate, a quartz substrate or an organic substrate. The touch unit 100 according to the embodiment is disposed between the base substrate 400 and the pixel units. The touch unit 100 comprises touch driving electrodes and touch sensing electrodes disposed to cross each other and to be insulated from pixel electrodes. Of course, it is also possible to dispose the pixel units between the base substrate 400 and the touch units 100. It is also possible to dispose the touch units 100 and the pixel units on different sides of the base substrate 400.

The thin film transistor of the embodiment comprises a gate 201, a source 205, a drain 202, an active layer 206 and a gate insulating layer 500, in which the gate insulating layer 500 is disposed between the gate 201 and the source 205, the drain 202, and the active layer 206 is formed over the source and the drain. In one embodiment of the present disclosure, a shielding layer 207 is further disposed ar the light incoming side of the active layer 206 to prevent light leakage from the active layer. A silicon nitride or a silicon oxide substrate can be further added on the active layer 206. In the present embodiment, the pixel electrode, the source and the drain are formed of ITO conductive film. Since the ITO conductive film commonly used has a large resistance, a metal layer can be added on the source and the drain connected to the active layer to decrease the resistance and to increase sensitivity of the device.

The touch device according to the embodiment further comprises common electrodes 208 connected to the electrochromic layer 203, the common electrode 208 acting as a voltage reference upon measurement, which can be connected together or provided individually. In the present embodiment, the electrochromic layer 203 is disposed between the pixel electrodes 204 and the common electrodes 208, and the common electrodes 208 can be connected with the touch electrodes or disposed to be insulated from the touch electrodes, wherein the common electrodes and the touch electrodes are connected only when the touch device is displaying, the touch electrodes can be duplicated as common electrodes, and touch electrodes can be touch sensing electrodes and/or touch driving electrodes. When a voltage is applied to the pixel electrodes, voltage difference between the pixel electrodes and the common electrodes changes, thereby generating a driving voltage on the electrochromic layer 203.

Figure 2:
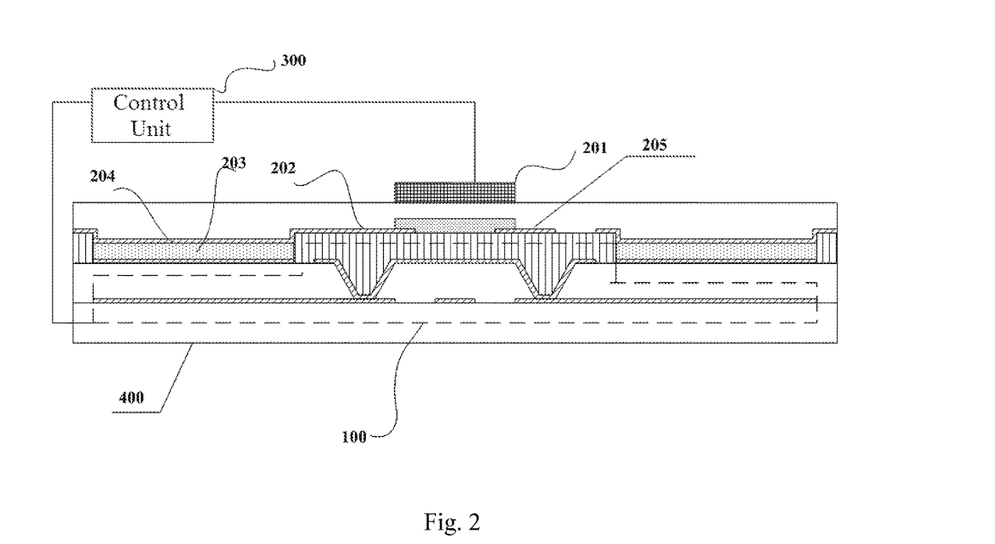
FIG. 2 is a schematic structural view of a touch device according to the second embodiment of the present disclosure.

FIG. 2 illustrates a schematic structural view of a touch device according to the second embodiment of the present disclosure. The embodiment differs from the first embodiment in that: the touch device further comprises a control unit 300 connected with the touch unit and the thin film transistor respectively to acquire the touch position and drive the pixel electrode corresponding to the thin film transistor to work according to the touch position. The control unit can be various controllers such as CPUs and monolithic computers and is connected with the touch sensing electrode of the touch unit and the gate line respectively for acquiring touch position signals transmitted from the touch unit and applying a scanning signal to the gate line according to the touch position signal, thereby driving the thin film transistor corresponding to the gate line to be turned on to control the pixel electrode corresponding to the thin film transistor to be charged so as to apply a driving signal to the electrochromic layer corresponding to the pixel electrode.

Figure 3:
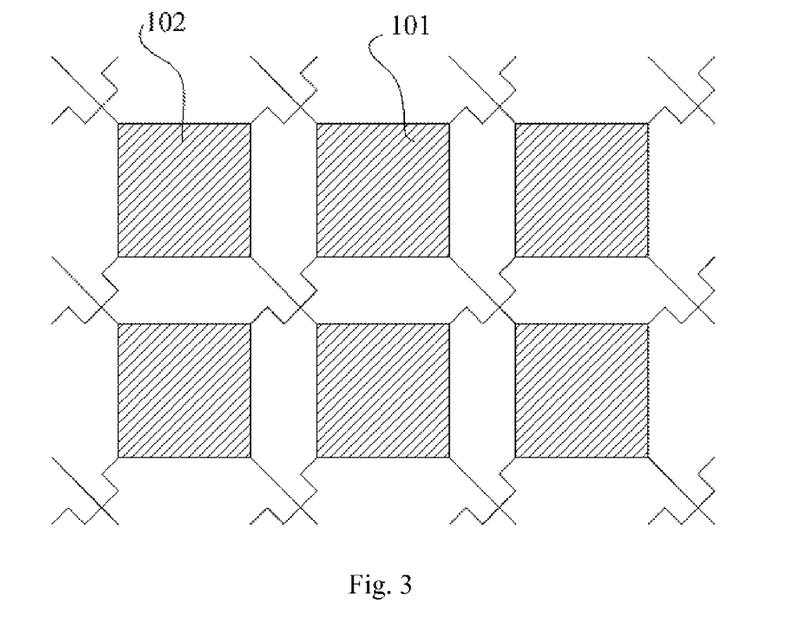
FIG. 3 is a schematic structural view of a touch unit according to one embodiment of the present disclosure.
Figure 4:
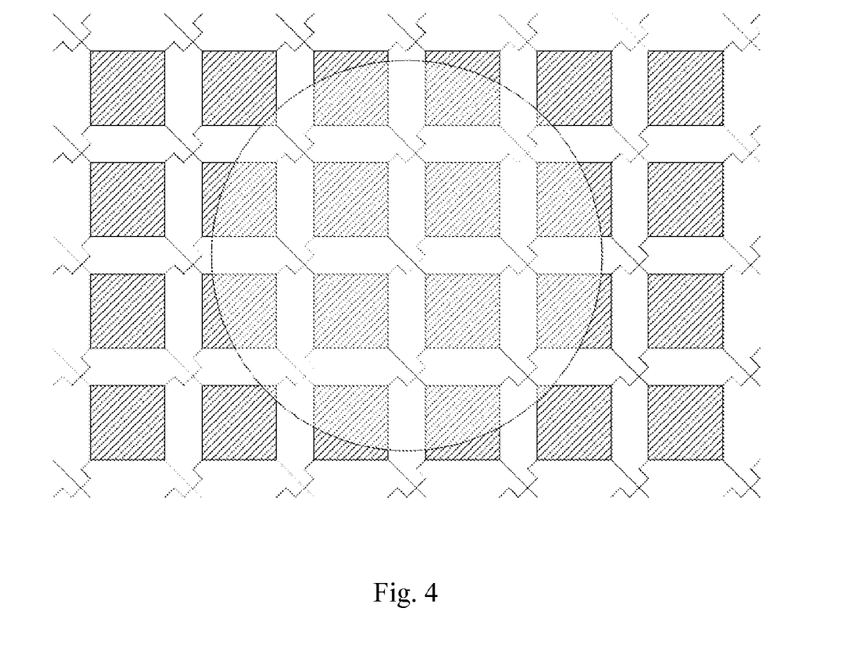
FIG. 4 is a schematic diagram of state of a touch device according to one embodiment of the present disclosure while being touched.
Figure 5:
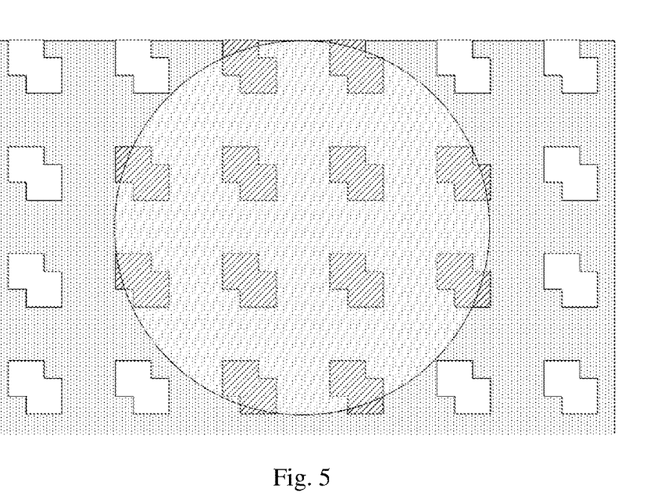
FIG. 5 is a schematic diagram of state of a touch device according to one embodiment of the present disclosure while being subject to electrochromism.

FIG. 3 to FIG. 5 illustrate schematic structural views and operation state diagrams of a touch unit according to another embodiment of the present disclosure. The touch unit comprises touch driving electrodes 101 and touch sensing electrodes 102 disposed crossing each other and being insulated from each other. The touch driving electrodes 101 or the touch sensing electrodes 102 are broken into a plurality of sub-electrodes in the crossing regions of the touch driving electrodes and the touch sensing electrodes. When the touch driving electrodes are broken into a plurality of sub-electrodes in the crossing regions, sub-electrodes of a touch driving electrode are electrically connected by a bridge line; and when the touch sensing electrodes are broken into a plurality of sub-electrodes in the crossing regions, sub-electrodes of a touch sensing electrode are electrically connected by a bridge line. The bridge lines in the embodiment are disposed at a position corresponding to the shielding layer 207 and are all covered by the shielding layer.

The embodiment utilizes a mutual capacitive touch technology to determine a touch position and control the electrochromic layer corresponding to the touch position to change color. The operation principle of a mutual capacitive touch screen is as follow. X axis electrode matrix and Y axis electrode matrix are arranged crossing each other and generate capacitances at crossing regions, that is, X axis and Y axis electrodes constitute two poles of a capacitor respectively. When a finger touches the capacitive screen, two electrodes near the touch point generate a coupling capacitance, resulting in variation of capacitance between the two electrodes. Upon detection, the Y axis electrode matrix send signals in turn in a time division manner, and X axis electrode matrix receive signals simultaneously, thereby obtaining capacitance values of all crossing positions of the X and Y axis electrode matrices. Coordinates of each touch point can be calculated according to the variation of capacitance. The touch driving electrodes and the touch sensing electrodes in this embodiment form a mutual capacitive structure. The touch driving electrodes are applied with scanning signals and are scanned row by row. Signals on each touch sensing electrode are read while scanning each row of touch driving electrode. Each crossing point can be scanned by one pass of scanning, therefore coordinates of the touch points can be detected.

FIG. 4 illustrates a state diagram upon touching. When an object such as a finger, a touch pen etc. contacts the touch device, capacitance between the touch driving electrode and the sensing electrode at the touch position changes, according to which the touch position can be determined. According to the touch position, a voltage is applied to the electrochromic layer corresponding to the pixel unit of the touch position, and the electrochromic layer will change its color, as illustrated in FIG. 5. In the touch device according to embodiments of the present disclosure, regions of the electrochromic layer that change color have a corresponding relationship with the coordinates of the touch point. The corresponding relationship can be set, for example, the color changing region corresponds to the touch position in a one-to-one manner, or corresponds to an enlarged region or a reduced region of the touch position, or corresponds to a position different from the touch position. When the position of the touch point is acquired, the control unit applies driving signals to an electrochromic layer of a corresponding position according to the corresponding relationship between the touch point and the electrochromic layer to enable the electrochromic layer at the position to change color.

A method for manufacturing a touch device according to at least one embodiment of the present disclosure comprises the following steps:

step S601: preparing a substrate;

step S602: depositing a layer of first conductive film on the substrate, forming first electrodes 101 and second electrodes 102 disposed crossing each other and being insulated from each other through a first patterning process, and breaking the first electrodes 101 into a plurality of sub-electrodes 103 in crossing regions of the first electrodes and the second electrodes;

step S603: forming a first passivation layer over the first conducting film through a second patterning process;

step S604: depositing a second conductive film on the first passivation layer and forming bridge lines for connecting broken sub-electrodes and a common electrode through a third patterning process;

step S605: disposing an electrochromic layer over the common electrode, and forming a shielding layer on the bridge lines;

step S606: forming a pixel electrode connected with the electrochromic layer through a fourth patterning process;

step S607: forming a thin film transistor acting as a switch for the pixel electrode.

In this method, a thin film transistor formed in step S607 comprises a gate, a source, a drain and an active layer, with a gate insulating layer disposed between the gate and the active layer. A shielding layer is further disposed at the light incoming side of the active layer. The electrochromic layer is disposed between a pixel electrode and a common electrode.

The method for manufacturing the touch device according to the embodiment is a manufacturing process corresponding to the touch device of the first embodiment. For the touch device of the second embodiment, the manufacturing method thereof is substantially the same. The difference lies in that the pixel unit is disposed between the base substrate and the touch unit. Most of the process is the same and detail of the manufacturing method will not be described any more.

The method for manufacturing the touch device according to the first embodiment of the present disclosure will be described below with reference to the accompanying drawings.

Figure 6A:
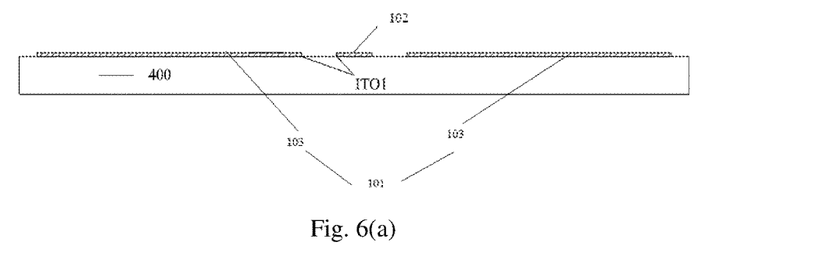
FIGS. 6(a)-(i) are schematic diagrams of various states of a touch device manufactured according to the present disclosure.

FIG. 6(a) illustrates a schematic diagram of a first state of the method for manufacturing the touch device according to an embodiment of the present disclosure, wherein a layer of first conductive film ITO1 is deposited on the base substrate 400, first electrodes 101 and second electrodes 102 disposed crossing each other and being insulated from each other are formed through a first patterning process, the first electrodes 101 being touch driving electrodes or touch sensing electrodes, and the touch driving electrodes or the touch sensing electrodes are broken into a plurality of sub-electrodes 103 in crossing regions.

Figure 6B:
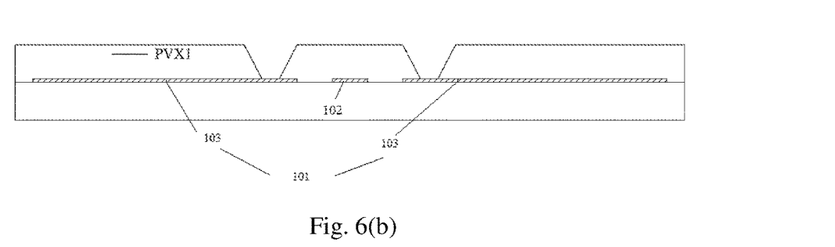

FIG. 6(b) illustrates a schematic diagram of a second state of the method for manufacturing the touch device according to an embodiment of the present disclosure, wherein a first passivation layer PVX1 is formed through a second patterning process over the first conductive film.

Figure 6C:
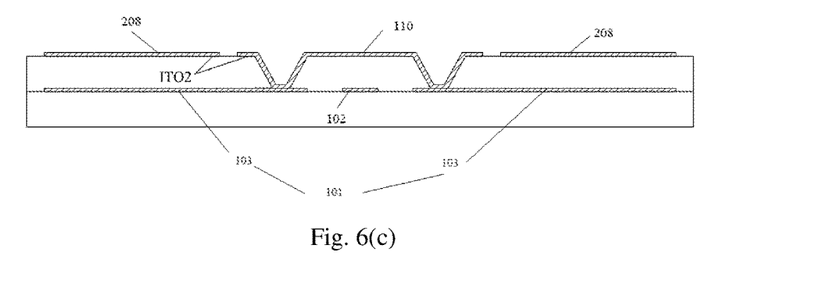

FIG. 6(c) illustrates a schematic diagram of a third state of the method for manufacturing the touch device according to an embodiment of the present disclosure, wherein a second conductive coating ITO2 is deposited over the first passivation layer, and bridge lines 110 for connecting broken sub-electrodes and a common electrode layer 208 are formed through a third patterning process.

Figure 6D:
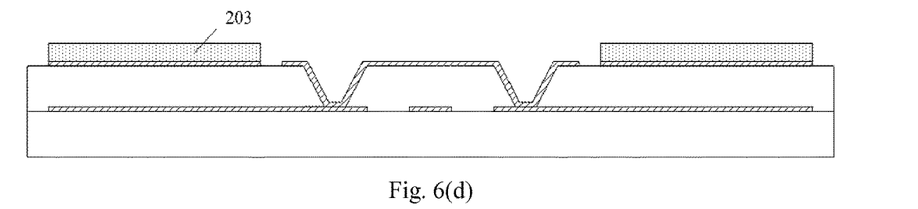

FIG. 6(d) illustrates a schematic diagram of a fourth state of the method for manufacturing the touch device according to an embodiment of the present disclosure, wherein an electrochromic layer 203 is disposed on the common electrode 208 such that the common electrodes 208 corresponds to the electrochromic layer 203 one by one.

Figure 6E:
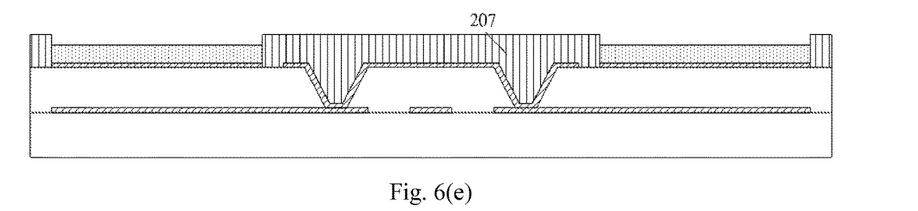

FIG. 6(e) illustrates a schematic diagram of a fifth state of the method for manufacturing the touch device according to an embodiment of the present disclosure.

Figure 6F:
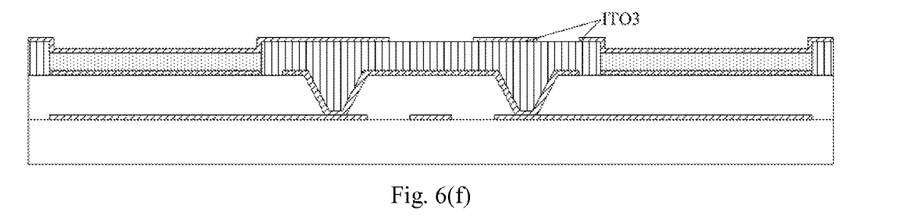

FIG. 6(f) illustrates a schematic diagram of a sixth state of the method for manufacturing the touch device according to an embodiment of the present disclosure, wherein a third conductive film ITO3 is disposed over the shielding layer 207 and the electrochromic layer, and a pixel electrode and a source and a drain of thin film transistor are formed through a fourth patterning process.

Figure 6G:
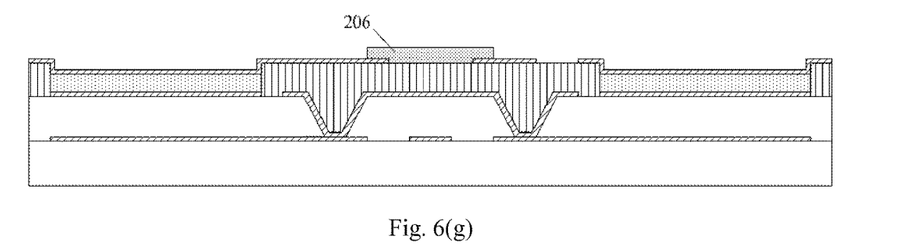

FIG. 6(g) illustrates a schematic diagram of a seventh state of the method for manufacturing the touch device according to an embodiment of the present disclosure, wherein an active layer 206 connected with the source and the drain is disposed in a region in the shielding layer, which is entirely in the region of the shielding layer.

Figure 6H:
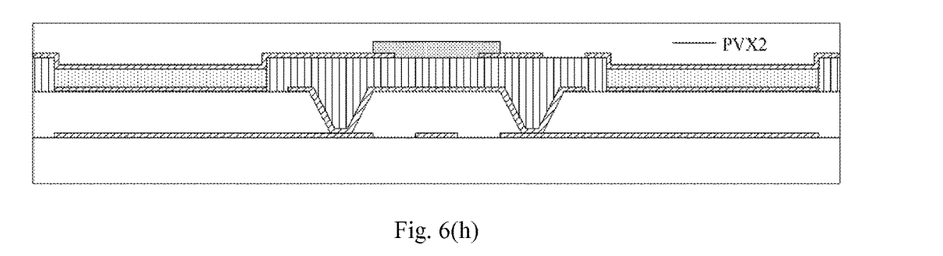

FIG. 6(h) illustrates a schematic diagram of an eighth state of the method for manufacturing the touch device according to an embodiment of the present disclosure, wherein a second passivation layer PVX2 (i.e., a gate insulating layer) is formed over the active layer.

Figure 6I:
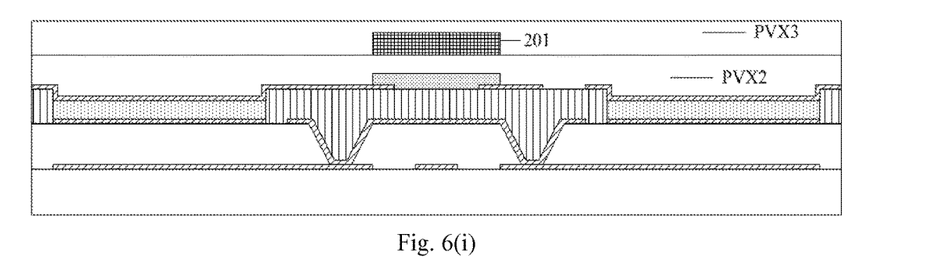

FIG. 6(i) illustrates a schematic diagram of a ninth state of the method for manufacturing the touch device according to an embodiment of the present disclosure, wherein a gate 201 is formed between the source and the drain, and a third passivation layer PVX3 is disposed over the gate.

In the above-mentioned technical solutions, the touch position is acquired by the touch unit and the pixel electrodes are controlled to operate according to the touch position so as to apply driving signals to the electrochromic layer connected with pixel electrodes, enabling color of respective electrochromic layer changed, thereby enhancing color change of the touch screen. Further, since the touch position is acquired by the touch unit, it is possible to control the electrochromic layer corresponding to the touch position to change its color. The touch device of the present disclosure can achieve transmission or no transmission of various pixel units under the effect of external light sources to thereby implement display function.

The above-mentioned specific implementations are just illustrative and can not be construed as a limitation. Those skilled in the art can make numerous modifications without departing from the gist of the method and the scope of the claims, which all belong to the scope of the present disclosure.

The foregoing are merely exemplary embodiments of the invention, but are not used to limit the protection scope of the invention. The protection scope of the invention shall be defined by the attached claims.

The present application claims priority of a China patent application No. 201410042187.1 filed on Jan. 28, 2014, the disclosure of which is hereby entirely incorporated by reference.

The invention claimed is:

1. A touch device comprising:
a pixel unit, comprising an electrochromic layer, a pixel electrode and a thin film transistor acting as a switch for the pixel electrode, the pixel electrode being connected with the electrochromic layer; and
a touch unit for acquiring a touch position comprising first electrodes and second electrodes disposed crossing each other and insulated from each other;
wherein the thin film transistor controls the pixel electrode corresponding to the touch position to operate according to the acquired touch position to apply a driving signal to the electrochromic layer connected with the pixel electrode.

2. The touch device of claim 1, further comprising a controller connected with the touch unit and the thin film transistor respectively and configured to acquire the touch position and to drive the pixel electrode corresponding to the thin film transistor to operate according to the touch position.

3. The touch device of claim 1, further comprising a base substrate, the touch unit disposed between the base substrate and the pixel unit, and the touch unit and the pixel unit are insulated from each other.

4. The touch device of claim 1, further comprising a base substrate, the pixel unit disposed between the base substrate and the touch unit, and the touch unit and the pixel unit insulated from each other.

5. The touch device of claim 1, further comprising a common electrode, the electrochromic layer being disposed between the common electrode and the pixel electrode.

6. The touch device of claim 1, wherein the first electrode is broken into a plurality of sub-electrodes at a crossing region, each of which being electrically connected by bridge lines.

7. The touch device of claim 1, further comprising a gate line and a data line disposed crossing each other, the pixel electrode disposed in a pixel unit defined by the gate line and the data line, the thin film transistor comprising a gate, a source and a drain, the gate being connected with the gate line, the source being electrically connected with the data line, and the drain being electrically connected with the pixel electrode, an active layer being formed on the source and the drain, and the active layer being provided with a shielding layer at a light incoming side.

8. The touch device of claim 1, wherein the electrochromic layer is made of an inorganic or an organic electrochromic material.

9. A method for manufacturing a touch device comprising:
providing a base substrate;
depositing a layer of first conductive film on the base substrate, forming a first electrode and second electrode disposed crossing each other and insulated from each other through a first patterning process, and breaking the first electrode into a plurality of sub-electrodes in crossing regions of the first electrode and the second electrode;
forming a first passivation layer over the first conductive film through a second patterning process;
depositing a second conductive film over the first passivation layer and forming bridge lines for connecting broken sub-electrodes and a common electrode through a third patterning process;
disposing an electrochromic layer over the common electrode, and forming a shielding layer on the bridge lines;
forming a pixel electrode connected with the electrochromic layer through a fourth patterning process; and
forming a thin film transistor acting as a switch for the pixel electrode.

10. The touch device of claim 2, further comprising a base substrate, the touch unit disposed between the base substrate and the pixel unit, and the touch unit and the pixel unit are insulated from each other.

11. The touch device of claim 2, further comprising a base substrate, the pixel unit disposed between the base substrate and the touch unit, and the touch unit and the pixel unit insulated from each other.

12. The touch device of claim 3, further comprising a base substrate, the pixel unit disposed between the base substrate and the touch unit, and the touch unit and the pixel unit insulated from each other.

13. The touch device of claim 2, further comprising a common electrode, the electrochromic layer being disposed between the common electrode and the pixel electrode.

14. The touch device of claim 3, further comprising a common electrode, the electrochromic layer being disposed between the common electrode and the pixel electrode.

15. The touch device of claim 4, further comprising a common electrode, the electrochromic layer being disposed between the common electrode and the pixel electrode.

16. The touch device of claim 2, wherein the first electrode is broken into a plurality of sub-electrodes at a crossing region, each of which being electrically connected by bridge lines.

17. The touch device of claim 3, wherein the first electrode is broken into a plurality of sub-electrodes at a crossing region, each of which being electrically connected by bridge lines.

18. The touch device of claim 4, wherein the first electrode is broken into a plurality of sub-electrodes at a crossing region, each of which being electrically connected by bridge lines.

19. The touch device of claim 5, wherein the first electrode is broken into a plurality of sub-electrodes at a crossing region, each of which being electrically connected by bridge lines.

20. The touch device of claim 2, further comprising a gate line and a data line disposed crossing each other, the pixel electrode disposed in a pixel unit defined by the gate line and the data line, the thin film transistor comprising a gate, a source and a drain, the gate being connected with the gate line, the source being electrically connected with the data line, and the drain being electrically connected with the pixel electrode, an active layer being formed on the source and the drain, and the active layer being provided with a shielding layer at a light incoming side.

* * * * *